Patented Jan. 18, 1949

2,459,547

UNITED STATES PATENT OFFICE 2,459,547

CELLULOSE OXAZOLIDONE ETHERS AND METHOD OF MAKING SAME

Frank K. Signaigo, Kenmore, N. Y., assignor to E. I. du Pont de Nemours & Company, Wilmington, Del., a corporation of Delaware No Drawing. Application October 8, 1946, Serial No. 702,076

19 Claims. (Cl. 260—213)

This invention relates to new cellulose derivatives and to the method of making the same. More particularly, it relates to new aminocellulose derivatives or products which can be converted to new aminocellulose derivatives, and to the method of preparing such cellulose derivatives.

United States Patent 2,136,299 discloses aminocellulose derivatives produced by reacting a sulfonic acid derivative of cellulose, for example cellulose aryl sulfonate containing the aryl sulfonate groups directly attached to the cellulose nucleus, with an amine having at least one hydrogen attached to the amino nitrogen, which in turn is attached to an aliphatic carbon atom.

An object of this invention is to provide new cellulose derivatives and the method of making the same.

Another object of this invention is to provide new aminocellulose derivatives and the method of preparing the same.

An additional object of this invention is to provide new heterocyclic cellulose derivatives and the method of preparing the same.

A further object of this invention is to provide new cellulose derivatives that can be converted to new aminocellulose derivatives, and the method of making the same.

A specific object of this invention is to provide cellulose oxazolidones and the method of making the same.

Other and additional objects will become apparent hereinafter.

The above objects are accomplished, in general, by reacting, in the presence of an alkali, cellulose or a low substituted cellulose ether with an oxazolidone having the following general formula:

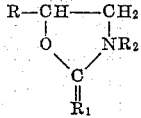

wherein

R is a halogenalkyl radical selected from the group which consists of chloroalkyl and bromoalkyl;

$R_1$ is selected from the group which consists of O and NH; and $R_2$ is a radical selected from the group which consists of alkyl, aryl, aralkyl, and hydrogen, for example, methyl, ethyl, propyl, phenyl, naphthyl, tolyl, benzyl, β-phenylethyl, etc.

When R is bromomethyl, $R_1$ is NH and $R_2$ is H, the compound 5-bromomethyl-2-iminooxazolidine (5-bromomethyloxazolidone-2-imide) will be in equilibrium with the compound 5-bromomethyl-2-aminooxazoline, whereby a free amine group is obtained:

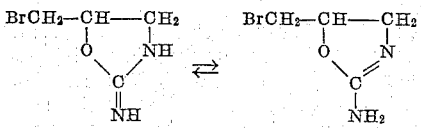

The reaction products are cellulose oxazolidone derivatives. They can be converted to amino ethers of cellulose by suitable hydrolysis. When a bromo- or chloromethyloxazolidone imide is used, the resulting cellulose oxazolidone imide is already basic and forms salts with strong acids. Both the basic cellulose oxazolidone imide and the aminocellulose ethers obtained by hydrolysis of the cellulose oxazolidones can be reacted with appropriate materials to form a cross-linked cellulose structure.

The details and manner of practicing the invention will become apparent by reference to the following specific examples, it being understood that these examples are merely illustrative embodiments of the invention and that the scope of the invention is not limited thereto. Throughout the examples, the proportions of the ingredients are parts by weight.

Example I

Cotton linters cellulose was steeped in an 18% sodium hydroxide solution for 1 hour at 21° C. and pressed to a 3:1 ratio. The pressed cellulose was shredded for 2¼ hours, at 25° C. for the first hour and at 15° C. for the remaining time. The shredded alkali cellulose was placed in a baratte and brought to 16°–18° C. Air was exhausted from the charge by evacuating and adding nitrogen three times. 0.09 part of ethylene oxide per part of alkali cellulose was then introduced into the baratte (starting at about 15″ Hg vacuum) at such a rate that the temperature of the reaction mixture could be maintained between 16° and 18° C. By the time all the ethylene oxide had been added, the pressure in the baratte had increased to 4 to 6 pounds per square inch, gage. Then as the reaction progressed, this pressure diminished. The reaction was stopped about ½ hour after there was no further diminishing of pressure. The time of the reaction was 2 hours. The resulting glycol cellulose was purified by slurrying 18 hours at 25° C. in a mixture consisting of 60 parts of methyl alcohol, 40 parts of water and 750 grams of concentrated sulfuric acid (66° Bé.). The slurry was then filtered, pressed, rewashed with a mixture consisting of 60 parts methyl alcohol and 40 parts water, and finally refiltered and re-pressed. The resulting glycol cellulose contained 0.33 mol hydroxyethyl groups per glucose unit.

A reaction mixture was made of the following ingredients:

| | |
|---|---|
| Glycol cellulose prepared as above | 6 parts slurried in 9 parts of a 60% methyl alcohol-40% water mixture |
| 5-bromomethyloxazolidone-2-imide | 4.4 parts |
| 10% aqueous caustic soda solution | 30 parts |

The reaction mixture was allowed to stand for 70 hours at 25° C. It was slurried and washed with a 60% methyl alcohol-40% water solution until alkali-free, and then it was further purified by extraction with methanol in a Soxhlet extractor.

The degree of substitution of the derivative was determined by a direct titration with standard acid using methyl red as an indicator. The product, which was soluble in 10% caustic soda solution, contained 0.27 mol methyloxazolidone imide groups per glucose unit.

This cellulose derivative was readily cross-linked and insolubilized by treatment at room temperature with a methanol solution of dimethyl adipate—about 0.4 part of ester per part of methanol. 40% of the amine groups were cross-linked by one treatment.

The 5-bromomethyloxazolidone-2-imide was prepared by the following method:

2,3-dibromopropylurea (100 grams) was dissolved in 500 cc. hot water and heated at boiling for about 15 minutes, cooled, and filtered. To the cool filtrate was added 100 cc. of a 20% potassium hydroxide solution. The precipitated product was filtered, washed free of caustic with cold water, and recrystallized from ethanol (M. P. 118°–120° C.).

$$CH_2BrCHBrCH_2NHCONH_2 \xrightarrow{KOH}$$

$$\underset{\underset{NH}{\overset{\|}{C}}}{\underset{O \diagdown \diagup NH}{BrCH_2=CH-CH_2}} \rightleftharpoons \underset{\underset{NH_2}{\overset{\|}{C}}}{\underset{O \diagdown \diagup N}{BrCH_2-CH-CH_2}}$$

Example II

Same as Example I, except that the reaction was carried out at 45° C. for 70 hours.

The product, after separation from the reaction mixture and purification, contained 0.34 mol methyloxazolidone imide groups per glucose unit.

Example III

Same as Example I, except that the reaction was carried out at 0° C. for 70 hours.

The product, after separation from the reaction mixture and purification, contained 0.16 mol methyloxazolidone imide groups per glucose unit.

Example IV

Same as Example I, except that the caustic concentration was 25% and the reaction was carried out at 25° C. for only 18 hours.

The product, after separation from the reaction mixture and purification, contained 0.17 mol methyloxazolidone imide groups per glucose unit.

Example V 15 parts of aged wood pulp alkali cellulose (24 hours at 25° C.) were reacted with 4.4 grams bromomethyloxazolidone imide at 25° C. in a reaction medium consisting of 10 parts of 2½% aqueous caustic soda.

The product, after separation from the reaction mixture and purification, contained 0.10 mol methyloxazolidone imide groups per glucose unit.

Example VI

A reaction mixture was made of the following ingredients:

| | Parts |
|---|---|
| Air-dried glycol cellulose (containing 0.33 mol hydroxyethyl groups per glucose unit) | 5 |
| 5-chloromethyloxazolidone | 3.3 |
| 2% aqueous caustic soda solution | 50 |

The reaction mixture was allowed to stand for 40 hours at a temperature of 25° C.

The product, after separation from the reaction mixture and purification, was analyzed by a Kjeldahl nitrogen determination. It contained 0.10 mol methyloxazolidone groups per glucose unit.

Example VII

A reaction mixture was made of the following ingredients:

| | Parts |
|---|---|
| Air-dried glycol cellulose (containing 0.33 mol hydroxyethyl groups per glucose unit) | 1.5 |
| 5-chloromethyloxazolidone | 12 |
| 10% aqueous caustic soda solution | 30 |

The reaction mixture was allowed to stand for 96 hours at a temperature of 25° C.

The product, after separation from the reaction mixture and purification, contained 0.26 mol methyloxazolidone groups per glucose unit.

Example VIII

A reaction mixture was made of the following ingredients:

| | Parts |
|---|---|
| Unpurified glycol cellulose (containing 0.25 mol hydroxyethyl groups per glucose unit and alkali) | 1.5 |
| 5-chloromethyloxazolidone | 3 |
| Benzene | 150 |

The reaction mixture was heated for 40 hours at a temperature of 80°C.

The product, after separation from the reaction mixture and purification, contained 0.17 mol methyloxazolidone groups per glucose unit.

The above detailed examples illustrate embodiments of the invention wherein specific oxazolidones constitute one of the reactants. The present invention is, however, not to be limited thereto. In practicing the invention, any oxazolidone of the following formula can be used:

$$\underset{\underset{R_1}{\overset{\|}{C}}}{\underset{O \diagdown \diagup NR_2}{R-CH-CH_2}}$$

wherein

R is a halogenalkyl radical, such as chloroalkyl or bromoalkyl, for example, chloromethyl, α-chloroethyl, β-chloroethyl, bromomethyl, α-bromoethyl, β-bromoethyl;

$R_1$ is selected from the group which consists of O and NH; and $R_2$ is a radical selected from the group which consists of alkyl, aryl, aralkyl, and hydrogen, for example, methyl, ethyl, propyl, phenyl, naphthyl, tolyl, benzyl, β-phenylethyl, etc.

Illustrative examples of oxazolidones which can be used are 5-chloromethyloxazolidone, 5-chloromethyl-3-phenyloxazolidone, and 5-bromomethyloxazolidone imide.

The degree of oxazolidone substitution in the product can vary within wide limits depending on the proportion of the reactants, the conditions of the reactants, and the degree of substitution of the cellulosic substance which constitutes one of the reactants.

The cellulose oxazolidone derivatives are soluble in aqueous caustic soda solutions providing the glycol cellulose used is of high enough substitution to be caustic-soluble. Better solubility of the derivatives can be obtained by using a glycol cellulose containing at least 0.62 mol hydroxyethyl groups per glucose unit. The alkali solubility of these derivatives can also be improved by xanthation.

The glycol cellulose can be prepared in any of the well-known manners and, in general, any glycol cellulose can be used. Preferably, a glycol cellulose which is soluble in a 10% aqueous caustic soda solution is preferred, though a water-soluble glycol cellulose can be used. The glycol cellulose can be air-dried or wet with final wash solution. It can also be purified or not, and, in the unpurified state, the glycol cellulose will contain alkali and the reaction can be carried out in a hydrocarbon, such as benzene, xylene, toluene or the like.

The invention is not restricted to the use of glycol cellulose, and, in place of glycol cellulose, cellulose or low substituted cellulose ethers, such as methyl cellulose, ethyl cellulose, etc., can be used.

The reaction is preferably carried out at a temperature of from 25°–45° C. However, it can be varied within wide limits and, in general, the reaction can be carried out at a temperature of from 0°–80° C.

The reaction is carried out in the presence of an alkali. The alkali can be incorporated in the reaction mixture as an aqueous solution or it can be incorporated through the use of unpurified or unwashed glycol cellulose or alkali cellulose. As shown by the examples, the reaction is preferably carried out in a 10% aqueous caustic soda solution, though a greater or lesser concentration can be used. In general, an aqueous caustic solution containing from 1%–50% caustic soda can be used.

The time of the reaction can also vary. Though optimum results have been obtained when the reaction was carried out for 70 hours, the time of the reaction can vary from 18 hours to several days.

The oxazolidone derivatives of cellulose, upon appropriate hydrolysis, can be converted into amino ethers of cellulose which can be subjected to further reactions, such as cross-linking with a di-ester. The oxazolidone-imide derivatives of cellulose are themselves amino ethers of cellulose and thus directly can be subjected to further reactions, such as cross-linking with a di-ester. These derivatives are so constituted that the heterocyclic modification is joined to the cellulose molecule by a stable ether link which resists most forms of chemical treatment. The heterocyclic part can be hydrolyzed without breaking the cellulose ether bond.

The cellulose oxazolidone derivatives of this invention can be utilized in the production of shaped articles, such as films, yarns, fibers, etc. In one procedure, the oxazolidone derivatives of cellulose can be xanthated and the xanthated material formed into an aqueous alkali solution, and such viscose solution can be cast or spun in any of the known coagulating and regenerating baths. The regenerated cellulose oxazolidone can, after conversion to the amino ether by hydrolysis, be insolubilized by cross-linking with a di-ester, such as, for example, methyl adipate.

In another procedure, the cellulose oxazolidone derivatives of this invention can be dissolved in an alkali and such alkali solution extruded or cast into an appropriate coagulating bath, such as a 20%–25% aqueous sodium sulfate solution. The resulting product can be converted by hydrolysis into the amino ether and such ether insolubilized by treatment with a di-ester.

Since the methyloxazolidone-imide derivatives of this invention are already amino ethers of cellulose, they need not be hydrolyzed, after precipitation or coagulation from an alkaline solution or after regeneration from an aqueous solution of the xanthate thereof, and can be insolubilized directly by cross-linking with an appropriate di-ester.

When the cellulose derivatives of this invention are to be formed into shaped structures by that procedure wherein they are precipitated from an alkali solution (other than viscose), the cellulose derivative is of the type which is soluble in alkali and is preferably obtained by reacting an alkali-soluble glycol cellulose (containing at least 0.62 mol hydroxyethyl groups per glucose unit), as hereinbefore described.

The amino ethers of cellulose prepared from the cellulose oxazolidone derivatives of this invention can also be appropriately treated with di-halides whereby valuable characteristics and properties will be imparted thereto.

Since it is obvious that many changes and modifications can be made in the above-described details without departing from the nature and spirit of the invention, it is to be understood that the invention is not to be limited thereto except as set forth in the appended claims.

I claim:

1. A method of preparing cellulose oxazolidones wherein the oxazolidone nucleus is attached to the cellulose unit by an ether link, which comprises reacting, in the presence of alkali, a cellulosic substance selected from the class which consists of cellulose and low substituted cellulose ethers with an oxazolidone having the following general formula:

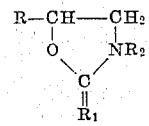

wherein

R is a halogenalkyl radical selected from the group which consists of chloroalkyl and bromoalkyl;

$R_1$ is selected from the group which consists of O and NH; and $R_2$ is a radical selected from the group which consists of alkyl, aryl, aralkyl, and hydrogen.

2. A method of preparing cellulose oxazolidones wherein the oxazolidone nucleus is attached to the cellulose unit by an ether link, which comprises reacting, in the presence of alkali, a cellulosic substance selected from the class which consists of cellulose and low substituted cellulose ethers with 5-bromomethyloxazolidone-2-imide.

3. A method of preparing cellulose oxazolidones wherein the oxazolidone nucleus is attached to the cellulose unit by an ether link, which comprises reacting, in the presence of alkali, a cellulosic substance selected from the class which consists of cellulose and low substituted cellulose ethers with 5-chloromethyloxazolidone.

4. A method of preparing cellulose oxazolidones wherein the oxazolidone nucleus is attached to the cellulose unit by an ether link, which comprises reacting, in the presence of alkali, a cellulosic substance selected from the class which consists of cellulose and low substituted cellulose ethers with 5-chloromethyl-3-phenyloxazolidone.

5. A method of preparing cellulose oxazolidones wherein the oxazolidone nucleus is attached to the cellulose unit by an ether link, which comprises reacting, in the presence of alkali, glycol cellulose with an oxazolidone having the following general formula:

$$\begin{array}{c} R-CH---CH_2 \\ | \quad\quad\quad | \\ O \quad\quad NR_2 \\ \diagdown \;\; \diagup \\ C \\ \| \\ R_1 \end{array}$$

wherein

R is a halogenalkyl radical selected from the group which consists of chloroalkyl and bromoalkyl;

$R_1$ is selected from the group which consists of O and NH; and $R_2$ is a radical selected from the group which consists of alkyl, aryl, aralkyl, and hydrogen.

6. A method of preparing cellulose oxazolidones wherein the oxazolidone nucleus is attached to the cellulose unit by an ether link, which comprises reacting, in the presence of alkali, glycol cellulose with 5-bromomethyloxazolidone-2-imide.

7. A method of preparing cellulose oxazolidones wherein the oxazolidone nucleus is attached to the cellulose unit by an ether link, which comprises reacting, in the presence of alkali, glycol cellulose with 5-chloromethyloxazolidone.

8. A method of preparing cellulose oxazolidones wherein the oxazolidone nucleus is attached to the cellulose unit by an ether link, which comprises reacting, in the presence of alkali, glycol cellulose with 5-chloromethyl-3-phenyloxazolidone.

9. Cellulose oxazolidones wherein the oxazolidone nucleus is attached to the cellulose unit by an ether link and obtained by reacting, in the presence of alkali, a cellulosic substance selected from the class which consists of cellulose and low substituted cellulose ethers with an oxazolidone having the following general formula:

$$\begin{array}{c} R-CH---CH_2 \\ | \quad\quad\quad | \\ O \quad\quad NR_2 \\ \diagdown \;\; \diagup \\ C \\ \| \\ R_1 \end{array}$$

wherein

R is a halogenalkyl radical selected from the group which consists of chloroalkyl and bromoalkyl;

$R_1$ is selected from the group which consists of O and NH; and $R_2$ is a radical selected from the group which consists of alkyl, aryl, aralkyl, and hydrogen.

10. Cellulose oxazolidones wherein the oxazolidone nucleus is attached to the cellulose unit by an ether link and obtained by reacting, in the presence of alkali, a cellulosic substance selected from the class which consists of cellulose and low substituted cellulose ethers with 5-bromomethyloxazolidone-2-imide.

11. Cellulose oxazolidones wherein the oxazolidone nucleus is attached to the cellulose unit by an ether link and obtained by reacting, in the presence of alkali, a cellulosic substance selected from the class which consists of cellulose and low substituted cellulose ethers with 5-chloromethyloxazolidone.

12. Cellulose oxazolidones wherein the oxazolidone nucleus is attached to the cellulose unit by an ether link and obtained by reacting, in the presence of alkali, a cellulosic substance selected from the class which consists of cellulose and low substituted cellulose ethers with 5-chloromethyl-3-phenyloxazolidone.

13. Cellulose oxazolidones wherein the oxazolidone nucleus is attached to the cellulose unit by an ether link and obtained by reacting, in the presence of alkali, glycol cellulose with an oxazolidone having the following general formula:

$$\begin{array}{c} R-CH---CH_2 \\ | \quad\quad\quad | \\ O \quad\quad NR_2 \\ \diagdown \;\; \diagup \\ C \\ \| \\ R_1 \end{array}$$

wherein

R is a halogenalkyl radical selected from the group which consists of chloroalkyl and bromoalkyl;

$R_1$ is selected from the group which consists of O and NH; and $R_2$ is a radical selected from the group which consists of alkyl, aryl, aralkyl, and hydrogen.

14. The alkyloxazolidone derivative of glycol cellulose wherein the alkyloxazolidone nucleus is attached to the cellulose unit by an ether link.

15. The alkyloxazolidone-imide derivative of glycol cellulose wherein the alkyloxazolidone-imide nucleus is attached to the cellulose unit by an ether link.

16. The alkyl-3-phenyloxazolidone derivative of glycol cellulose wherein the alkyl-3-phenyloxazolidone nucleus is attached to the cellulose unit by an ether link.

17. The methyloxazolidone derivative of glycol cellulose wherein the methyloxazolidone nucleus is attached to the cellulose unit by an ether link.

18. The methyloxazolidone-imide derivative of glycol cellulose wherein the methyloxazolidone-imide nucleus is attached to the cellulose unit by an ether link.

19. The methyl-3-phenyloxazolidone derivative of glycol cellulose wherein the methyl-3-phenyloxazolidone nucleus is attached to the cellulose unit by an ether link.

FRANK K. SIGNAIGO.

REFERENCES CITED

The following references are of record in the file of this patent:

UNITED STATES PATENTS

| Number | Name | Date |
| --- | --- | --- |
| 2,136,299 | Haskins | Nov. 8, 1938 |
| 2,233,475 | Dreyfus | Mar. 4, 1941 |

Certificate of Correction

Patent No. 2,459,547.   January 18, 1949.

FRANK K. SIGNAIGO

It is hereby certified that errors appear in the printed specification of the above numbered patent requiring correction as follows:

Column 3, line 44, Example I, for the left-hand portion of the formula reading "$BrCH_2=CH\text{------}CH_2$" read $BrCH_2\text{---}CH\text{------}CH_2$; lines 45 to 47, for the right-hand portion of the formula reading

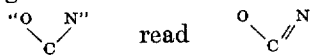

and that the said Letters Patent should be read with these corrections therein that the same may conform to the record of the case in the Patent Office.

Signed and sealed this 28th day of June, A. D. 1949.

[SEAL]

THOMAS F. MURPHY,
*Assistant Commissioner of Patents.*